United States Patent [19]
Yoshida et al.

[11] Patent Number: 5,713,325
[45] Date of Patent: Feb. 3, 1998

[54] ENGINE INJECTION CONTROL

[75] Inventors: Takeo Yoshida; Takahiro Suzuki, both of Iwata, Japan

[73] Assignee: Yamaha Matsudoki Kabushiki Kaisha, Iwata, Japan

[21] Appl. No.: 655,628

[22] Filed: May 30, 1996

[30] Foreign Application Priority Data

May 31, 1995 [JP] Japan ................. 7-157161

[51] Int. Cl.$^6$ ................. F02B 17/00; F02B 25/20
[52] U.S. Cl. ................. 123/295; 123/73 C; 123/305; 123/481
[58] Field of Search ................. 123/73 C, 305, 123/295, 481

[56] References Cited

U.S. PATENT DOCUMENTS

| | | | |
|---|---|---|---|
| 4,768,474 | 9/1988 | Fujimoto et al. | 123/481 X |
| 4,790,270 | 12/1988 | McKay et al. | 123/73 C |
| 4,938,213 | 7/1990 | Tanahashi et al. | 123/73 C |
| 4,991,558 | 2/1991 | Daly et al. | 123/481 |
| 5,097,811 | 3/1992 | Baumuller | 123/481 |

FOREIGN PATENT DOCUMENTS

WO 93/22545  11/1993  WIPO ................. 123/73 C

*Primary Examiner*—Tony M. Argenbright
*Attorney, Agent, or Firm*—Knobbe, Martens, Olson & Bear, LLP

[57] ABSTRACT

A number of embodiments of engines having direct cylinder injection wherein the fuel injector is positioned so as to be shrouded by the piston during at least a portion of its stroke. This permits the use of less expensive and lower pressure fuel injection nozzles. The spray pattern of the injector is chosen so that some fuel is sprayed toward the spark plug to provide stratification, but the major portion is directed toward the head of the piston so to as insure a homogeneous mixture when operating at high speed, high load conditions. In order to improve scavenging under difficult running conditions injection may be skipped for one or more cycles to purge the cylinder of exhaust gasses before another injection occurs.

22 Claims, 14 Drawing Sheets

ENGINE INJECTION CONTROL

BACKGROUND OF THE INVENTION

This invention relates to a direct cylinder fuel-injected engine and more particularly to an improved injection control for such engines.

In the interest of improving engine performance and particularly fuel economy and exhaust emission control, the utilization of fuel injection offers a number of advantages. It has been generally the practice to employ manifold-type fuel injection systems because of their simplicity and the fact that they permit the use of lower cost fuel injectors.

Although direct cylinder injection has a number of advantages over manifold injection, the hostile environment in the combustion chamber at the time of combustion necessitates very high cost fuel injection systems and particularly the fuel injector which itself is exposed in the combustion chamber.

A type of direct fuel injection system has been proposed, however, where the fuel injector is mounted in the cylinder block and projects so that its spray axis extends through one of the cylinder bores rather than the more conventional mounting in the cylinder head. By mounting the fuel injector so that it is shrouded at times by the piston,. it is possible to utilize lower cost fuel injectors than those which are mounted in the cylinder head. Because the piston shrouds the fuel injector during at least a portion of the combustion cycle, the fuel injector need not be capable of withstanding the same combustion conditions as cylinder head mounted fuel injectors.

Even though this type of direct cylinder injection can provide improved engine performance, there are some conditions with a two-cycle engine where further improvements in engine control and operation are desirable. One particularly difficult running condition for two-cycle engines is the low speed, low load condition. During this condition, as with other portions of the engine running cycle, there may be a fairly large. amount of residual exhaust gas in the cylinder at the completion of combustion and which is not totally scavenged from the cylinder. On the next cycle when the fuel is injected, these residual exhaust gases may make it difficult or impossible for the engine to run smoothly.

That is, when the spark plug fires, the mixture may not or may not burn completely. If fuel is continued to be injected when this type of misfiring occurs, then the situation can compound itself and the engine will run very rough and may eventually stall. In any event, the roughness of the engine is not particularly satisfactory.

These problems are particularly acute with certain types of applications such as with outboard motors or other marine propulsion applications. Frequently, in a marine propulsion system, the engine is operated at low speeds and, in fact, may be operated for long periods of time at lower than idle speeds when trolling. Thus, such misfiring due to high residual amounts of exhaust gas can not only make the engine running rough, but also can disturb occupants of the watercraft and may cause other problems.

It is, therefore, a principal object of this invention to provide an improved fuel injection system and fuel injection control method for such engines.

It is a yet further object of this invention to provide an improved fuel injection system and control method particularly adapted for use in engines having a direct cylinder injection through the cylinder wall.

SUMMARY OF THE INVENTION

This invention is adapted to be embodied in a direct cylinder injected, two cycle, internal combustion engine and a method of operating such an engine. The engine is comprised of a cylinder block having a cylinder bore extending from an upper peripheral edge closed by a cylinder head. A piston reciprocates in the cylinder bore between a bottom dead center (BDC) position and a top dead center (TDC) position and forms with the cylinder bore and the cylinder head a variable volume chamber. Scavenge and exhaust ports open through the cylinder bore for admitting a fresh charge and exhausting a burnt charge, respectively from the chamber. A fuel injector is supported within the cylinder block and has a nozzle spray axis that enters into the cylinder bore in a generally transverse direction. The spray axis intersects the. cylinder bore at the point where it discharges such that the spray axis is covered by the piston, during at least a portion of its stroke. A spark plug fires the charge in the chamber.

In accordance with an engine operating in accordance with the invention, under some running conditions the injection of fuel by the fuel injector is discontinued for one or more cycles so as to permit purging of the combustion chamber from residual exhaust products to improve running.

In accordance with a method for practicing the invention, the injection of fuel from the fuel injector is discontinued for one or more cycles when operating under conditions when it is desirable to purge residual exhaust gases from the chamber to improve running.

DETAILED DESCRIPTION OF THE PREFERRED EMBODIMENTS OF THE INVENTION

Figure 1:
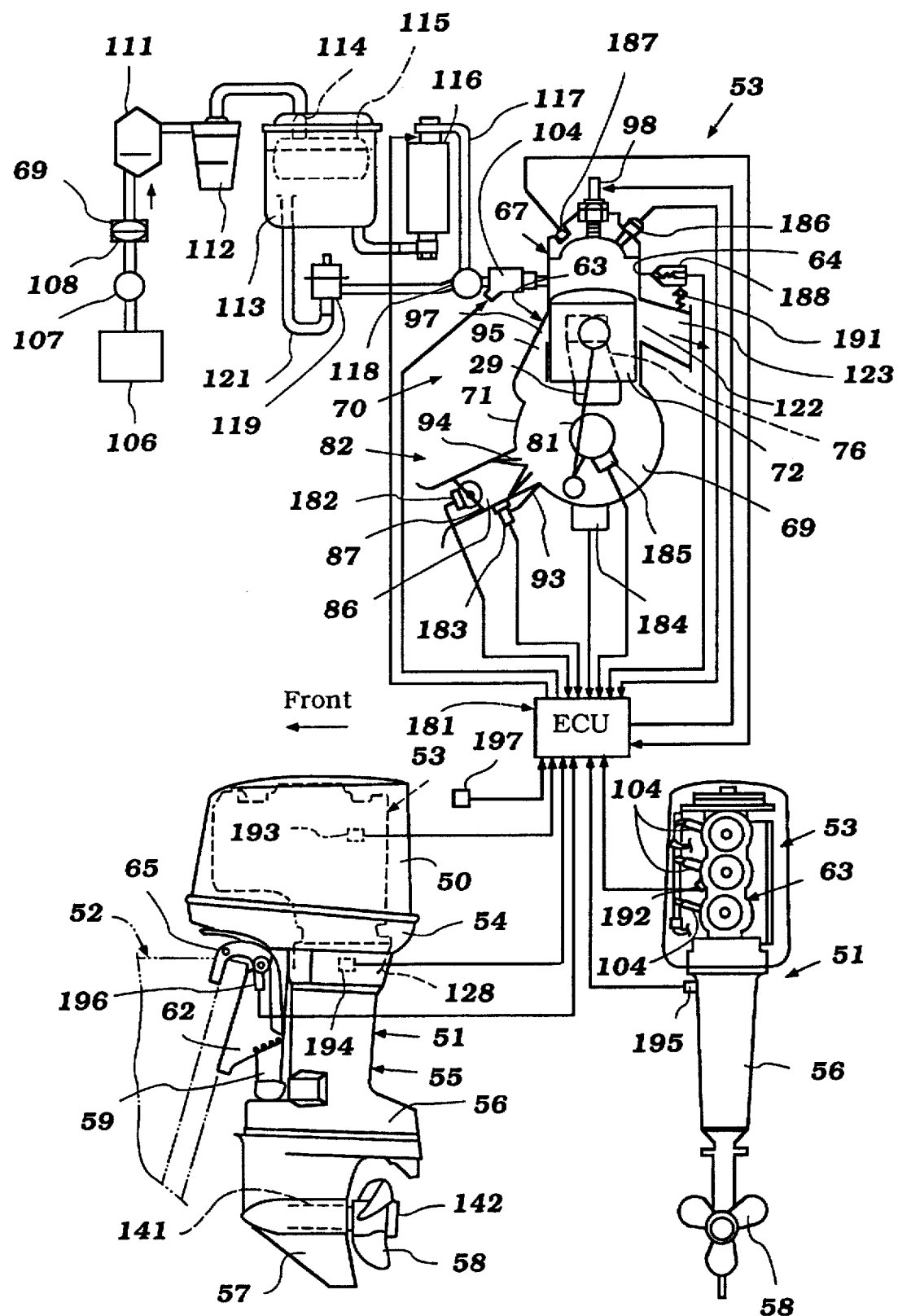
FIG. 1 is a view showing, at the lower portion, an outboard motor constructed and operated in accordance with an embodiment of the invention as attached to the transom of an associated watercraft which is shown partially and in phantom and, in the upper view, a top cross-sectional view taken through the engine and showing the engine in part schematically along with the components of the fuel injection and control system for the engine.

Referring now to the first embodiment, which is shown in FIGS. 1-15, this embodiment will be described first by reference particularly to FIGS. 1 and 2. This embodiment is adapted to be utilized in conjunction with an outboard motor, which is indicated generally by the reference numeral 51 and which is shown as attached to the transom of a watercraft, which watercraft is indicated generally by the reference numeral 52 but which is shown in phantom. The invention is described in conjunction with an outboard motor because certain facets of it have particular application to two-cycle crankcase compression internal combustion engines. Such engines are frequently employed as the power plants for outboard motors, but as will be apparent by reference to other embodiments, the invention may be utilized in conjunction with applications for two-cycle engines other than outboard motors.

Also and as will also become apparent by reference to additional embodiments, the invention is not limited to its applicability to two-cycle engines. Although the invention has particular utility with two-cycle engines because of the emission control problems particularly peculiar to these engines due to the scavenging cycle, the invention also may be utilized with other ported type engines.

Although the invention deals primarily with the engine and its control system, the total environment will be described by continuing reference to FIGS. 1 and 2. The outboard motor 51 includes a power head that includes a powering internal combustion engine 53. In the illustrated embodiment and as has been noted, the engine 53 is a two-cycle, crankcase compression engine. Also, in the illustrated embodiment the engine 53 is of the three cylinder, in-line type. For the reasons already noted, it will be apparent to those skilled in the art how the invention can be utilized with other types of engines and engines having other configurations.

In addition to the engine 53, the power head includes a protective cowling that is comprised of a lower tray portion 54 to which a detachable main cover portion 50 is connected in a known manner. This power head is formed at the upper end of a drive shaft housing 55. The drive shaft housing 55 includes an outer casing 56 which includes certain components, some of which will be described. In addition, a drive shaft which is driven by the engine output shad is journaled in the drive shaft housing 55 and depends into a lower unit 57. A propeller 58 is fixed on a propeller shaft driven by a transmission in the lower unit 57 for powering the associated watercraft 52.

A steering shaft (not shown) is affixed to the outer casing 56 of the drive shaft housing 55. This steering shaft is journaled in a swivel bracket 59 for steering of the outboard motor 51 about a generally vertically extending steering axis in a manner well known in this art. In addition, the swivel bracket 59 is pivotally connected by a trim pin 61 to a clamping bracket 62. This pivotal connection permits tilt and trim movement of the outboard motor 51 in a manner well known in this art. As has been noted, the construction of the outboard motor 51 has been described primarily to permit those skilled in the art to understand an environment in which the invention may be utilized. Since the invention deals with the engine 53, and primarily with its fuel injection system and operation, further description of the outboard motor, except for components which are associated more directly with the engine 53, will not be made. Those skilled in the art can refer to any known constructions for features of outboard motors with which the invention can be practiced.

The engine 53 will now be described in more detail by continuing reference to FIG. 1 and additionally to FIG. 3. The engine 53 includes a cylinder block assembly, indicated generally by the reference numeral 63, in which three aligned vertically spaced cylinder bores 64 are formed by pressed or cast-in cylinder liners 65. It should be readily apparent, however, that the invention may be practiced with engines wherein the cylinder bores are formed directly in the material of the cylinder block 63, or by plated liners formed therein.

The cylinder bores 64 extend upwardly and terminates at an upper surface 66 of the cylinder block 63. Actually, the engine is oriented so that the cylinder block surface 66 is at one end of the engine.

A cylinder head assembly, indicated generally by the reference numeral 67, is affixed to the cylinder block 63 in any known manner. The cylinder head assembly is in sealing relation with the block surface 66. The cylinder head 67 is provided with individual recesses 68 which form a portion of the combustion chambers of the engine for each cylinder, as will become apparent.

The end of the cylinder bores 64 opposite to the cylinder head 67 forms a crankcase chamber 69. This crankcase chamber 69 is formed by a skirt of the cylinder block 63 and a crankcase member 71 that is detachably affixed thereto in a known manner. In accordance with typical two-cycle engine practice, the crankcase chamber 69 associated with each of the cylinder bores 64 are sealed relative to each other so as to permit the induction of a charge thereto.

Pistons 72 are slidably supported in each of the cylinder bores 64. The pistons 72 have head portions 73 that are formed with upper and lower piston ring grooves 74 and 75 in which respective piston rings 76 and 77 are received. As is well known in this art, the piston rings 76 and 77 form a sealing function between the pistons 72 and the cylinder bore 64 so as to complete the formation of the combustion chamber. Since at top dead center position, the combustion chamber is formed primarily by the cylinder head recess 68, at times this reference numeral will also be used to refer to the combustion chamber of the engine.

The pistons 72 are each connected by means of a piston pin 78 to the small end of a connecting rod 79. Each connecting rod 79 is journaled on a respective throw of a crankshaft 81. As is typical with two-cycle engine practice, the crankshaft 81 rotates about a vertically extending axis so as to facilitate its connection to the drive shaft afore-referred to.

In view of the fact that the engine 53 in the illustrated embodiment is of the three cylinder type, in order to provide equal firing intervals, the throws of the crankshaft 81 associated with each of the connecting rods 79 are offset from each other by 120°. Of course, other arrangements also may be employed.

An induction system, indicated generally by the reference numeral 82, is provided for delivering an air charge to the crankcase chamber 69 as the pistons 71 move upwardly during their stroke. As will be seen in FIG. 3, where the piston 72 is shown approximately midway in its stroke, the piston moves from a bottom dead center position, wherein the head 73 is spaced a distance L from the upper end of the cylinder bore 64 in the cylinder head surface 68.

At its top dead center position, as will be described later, the piston is disposed so that the head 73 substantially coincides with the surface 66. The position of the piston rings 76 and 77 in this top dead center (TDC) position are shown in phantom lines in this figure. In this position, the lowermost portion of the uppermost piston groove 74 is disposed at a distance RS below the cylinder block upper surface 66.

Figure 2:
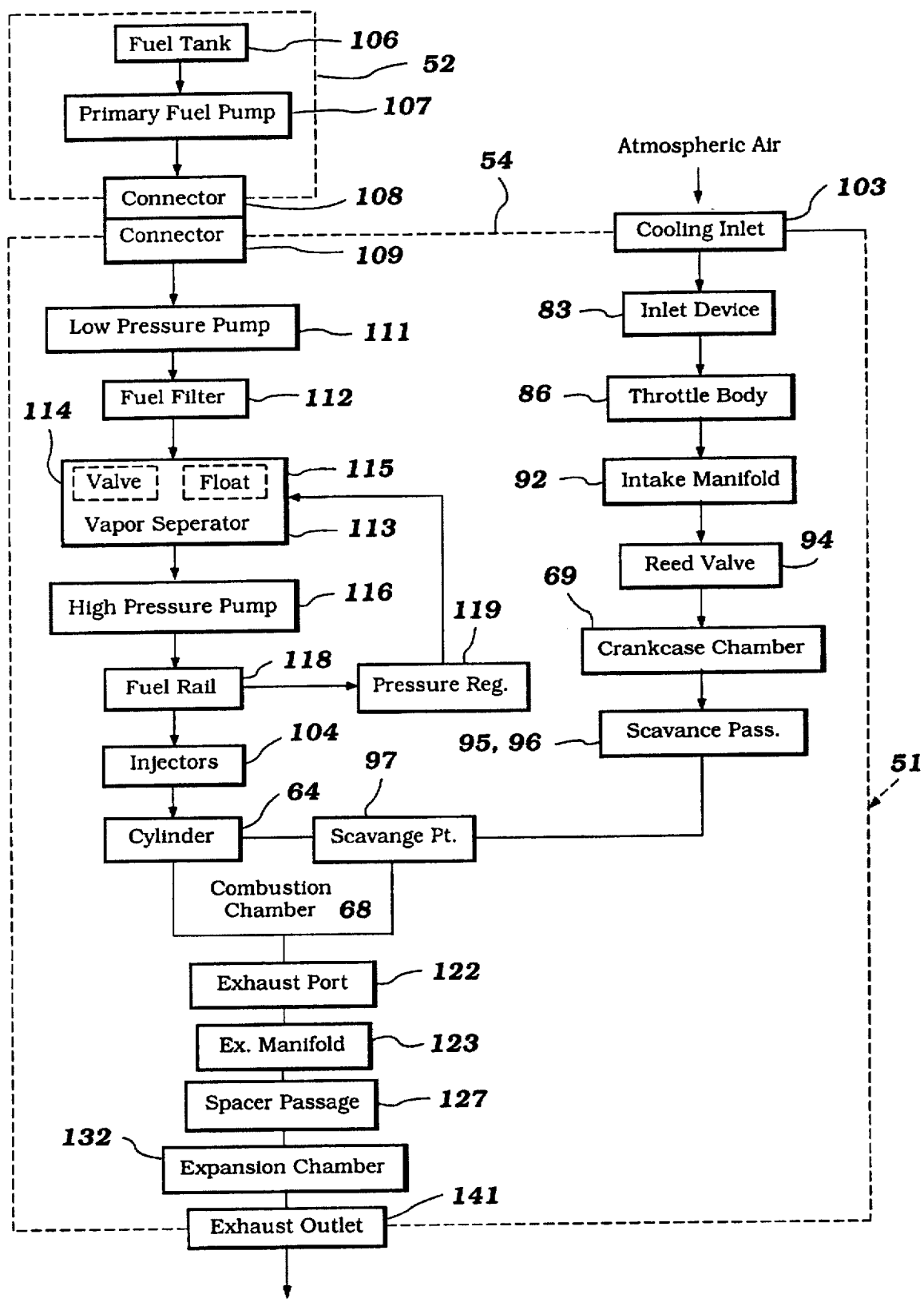
FIG. 2 is a partially schematic block diagram showing the fuel and air supply system for the engine.
Figure 5:
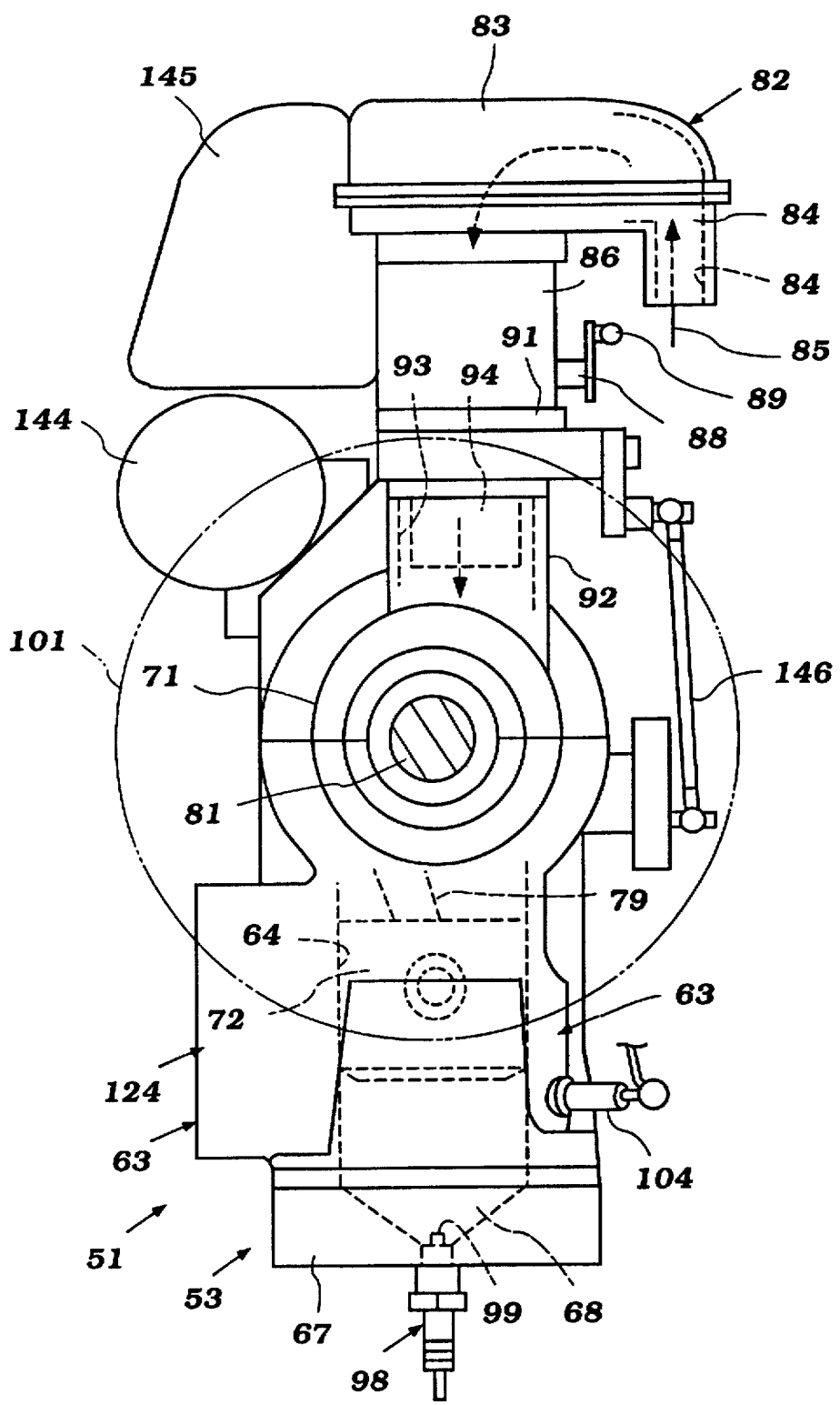
FIG. 5 is a top plan view of the engine of the outboard motor with the protective cowling removed and other portions shown in phantom.

The induction system 82 may be seen best in FIGS. 1, 2 and 5, and it includes a silencing air inlet device 83 having one or more atmospheric air inlet openings 84 that receive air flowing in the direction indicated by the arrow 85. This air flow is admitted into the protective cowling by one or more air inlet openings formed in the main cowling member 50, as is well known in this art and which are illustrated schematically in FIG. 2.

The inducted air passes into throttle bodies, indicated generally by the reference numeral 86, in which a butterfly-type throttle valves, indicated generally by the reference numeral 87 and shown in FIG. 1, are positioned. Each crankcase chamber 69 is provided with a respective throttle body 86 and throttle valve 87. These throttle valves all are positioned on respective throttle valve shafts 88 that have link arms 89 at the end thereof for connection to an appropriate linkage system for controlling the speed of the engine, as is well known in this art.

The throttle bodies 86 have flange portions 91 that are connected to intake manifolds 92 which communicate with intake ports 93 formed in the crankcase member 71 for delivery of the air charge to the crankcase chamber 69. A reed-type check valve 94 is provided in each of the intake ports 93 so as to permit the air charge to be inducted into the crankcase chambers 69 when the pistons 72 are on their up or intake stroke. However, when the pistons 72 move downwardly to compress the charge in the crankcase chamber 69, the reed-type check valves 94 will close and preclude reverse flow.

The charge which has been compressed in the crankcase chambers is then transferred to the combustion chambers 68 through a scavenging system, indicated generally by the reference numeral 70. This scavenging system 70 includes a center scavenging passage 95 (see FIG. 3) and a pair of side scavenging passages 96, which are disposed on opposite sides thereof. These scavenge passages 95 and 96 communicate with the combustion chamber 68 during a portion of the stroke of the piston through respective scavenge ports 97. They also cooperate with the exhaust port, yet to be described, to create a Schnurl type scavenging flow.

A spark plug 98 is mounted in the cylinder head 67 for each combustion chamber recess 68. The spark plugs 98 have their spark gaps 99 disposed substantially at the center of the recesses 68.

A flywheel magneto assembly, indicated generally by the reference numeral 101, is connected to the upper end of the crankshaft 81 by means of a key and nut 102 so as to generate electrical power for firing of the spark plugs 98 and providing other electrical power for the engine.

A fuel supply charge forming system is provided for supplying fuel to the combustion chamber recesses 68 for firing by the spark plugs 98. This fuel supply system will be described by primary reference to FIGS. 1 and 2, with this latter figure showing also certain components of the air induction system already described in a schematic fashion. Reference has been made to the atmospheric air inlet in the protective cowling, and this is shown schematically in FIG. 2, and is identified generally by the reference numeral 103.

The fuel supply or charge forming system includes fuel injectors, indicated generally by the reference numeral 104, and which have a preferred construction in accordance with the embodiment which will be later described. Each fuel injector 104 is mounted so that its spray port aligns with an opening 105 in the cylinder bore 64, and specifically the liner 65, so that the injector axis "x" lies on a line that is generally perpendicular to the axis of the cylinder bore 64 and which is spaced at a distance A below the upper cylinder head surface 66. The spray relationship will be described later.

It should be noted, however, that the injectors 104 are positioned generally vertically above the center scavenge passages 95 for each cylinder. Also, the scavenge passages are rotationally offset so as to permit a relatively close spacing of the distance between these cylinders. This rotational offsetting permits close positioning of the cylinder bores 64 without interference between the scavenge passages 96, of adjacent cylinders and thus permits the use of a shorter engine than with other types of constructions.

Referring now primarily to FIGS. 1 and 2, the fuel supply system includes a portion which is mounted in the hull 52 and which is shown, in part only schematically. This includes a main fuel tank 106 that is mounted within the hull of the watercraft, and which includes a priming pump 107. The pump 107 delivers fuel to the one connector 108 of a quick-disconnect coupling. The coupler 108 communicates with a coupling 109 carried by the cowling tray 54 and which, in turn, delivers the fuel to an engine driven low-pressure fuel pump 111.

The low-pressure fuel pump 111, in turn, delivers fuel under pressure to a fuel filter 112. The fuel filter 112, in turn, delivers fuel to a vapor separator, indicated generally by the reference numeral 113. The fuel vapor separator 113 is comprised of a cavity in which a chamber is formed that is filled with fuel to a predetermined level controlled by means of a float that operates a needle valve 114 for maintaining a uniform level of fuel in the separator 113. The float is indicated schematically at 115.

The vapor separator 113 is provided with an atmospheric vent which may communicate with the air induction system to permit vapors separated from the fuel to be discharged from the vapor separator 113 without being discharged back to the atmosphere.

A high-pressure pump 116 is provided for drawing fuel from within the vapor separator 113 and delivering it to a main fuel line 117. In an actual physical embodiment, the high-pressure pump 116 may, in fact, be immersed within the vapor separator 113.

The high-pressure line 117, in turn, delivers fuel to the fuel injectors 104 through a fuel rail 118. A single fuel rail 118 supplies fuel to each of the injectors 104. A pressure control valve 119 is mounted in one end of the fuel rail 118 and regulates the pressure of fuel supplied to the injectors 104 so as to maintain a substantially constant pressure thereat. This pressure is maintained by dumping excess fuel back to the vapor separator 113 through a return line 121.

Referring again to FIG. 3 in addition to FIGS. 1 and 2, each of the cylinder bores 64 is provided with a respective exhaust port 122 which is generally diametrically opposed to the center scavenge port 97 associated with the center scavenge passageway 95. These exhaust ports 122 extend through the side of the cylinder block 63 and communicate with an exhaust manifold collector chamber 123 formed in the side thereof. This chamber 123 is defined between the cylinder block 63 and a cover piece 124 that is affixed thereto. The cover piece 124 is provided with a cooling jacket portion 125 which is supplied with coolant, in a manner to be described.

In this regard, it should be noted that both the cylinder block 63 and cylinder head 67 are formed with cooling jackets 126. These cooling jackets 126 communicate with each other, and also with the exhaust manifold cooling jacket 125. Cooling water is delivered to these cooling jackets 125 and 126 from the body of water in which the watercraft is operating through a coolant circulation system of a type well known in the outboard motor art.

This cooling circulation system includes a water pump (not shown) that is mounted at the interface between the drive shaft housing member 56 and the lower unit 57. Water flows through these cooling jackets 125 and 126 and then is discharged back into the body of water in which the watercraft is operating, in a manner which will be described.

Figure 4:
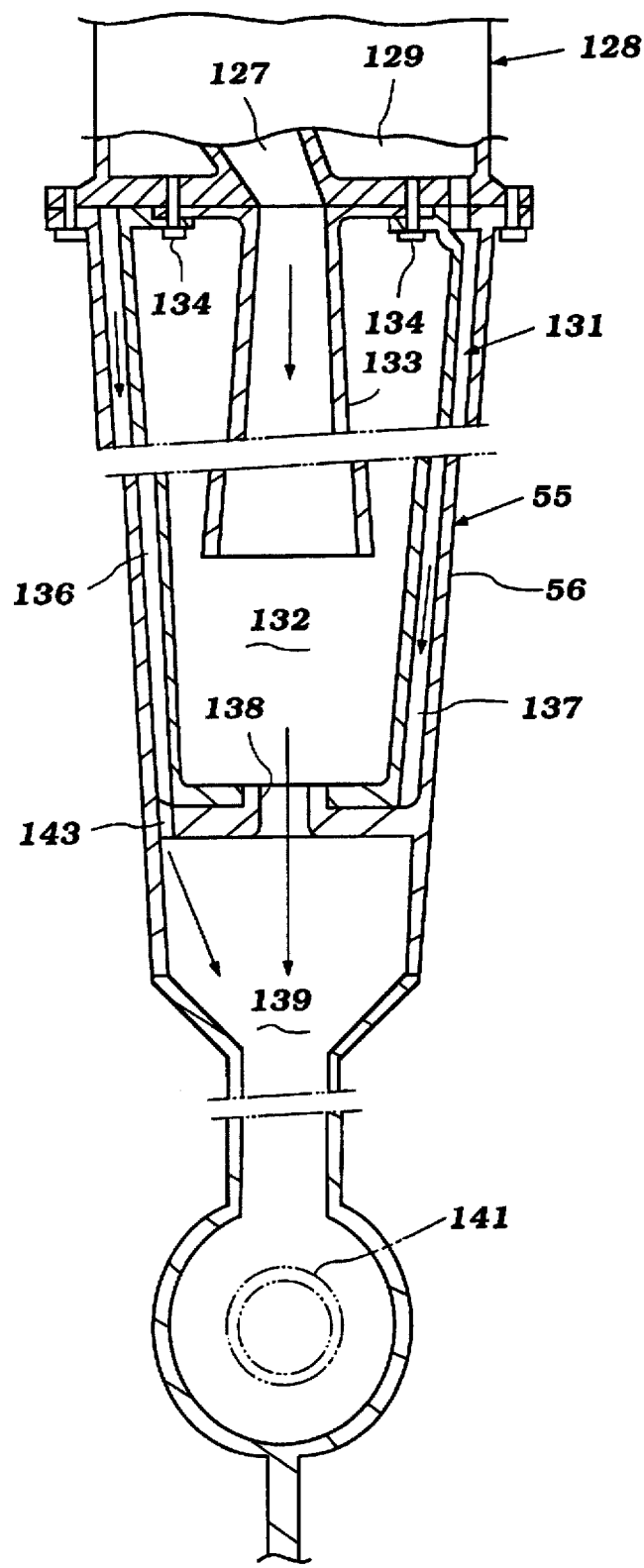
FIG. 4 is a partial cross-sectional view looking in the same direction as FIG. 3 and shows the lower portion of the outboard motor and of the portion shown in the lower right-hand side of FIG. 1.

The exhaust manifold or collector section 123 extends downwardly and opens through a lower face of the cylinder block 63 (see FIG. 4). There it communicates with an exhaust passageway 127 formed in a spacer or guide plate, indicated generally by the reference numeral 128, that is disposed between the engine 53 and the upper portion of the drive shaft housing 55. This spacer plate 128 may span the upper portion of the drive shaft housing and be contained within, at least in pan, the lower tray 54 of the protective cowling. A water cooling jacket 129 is formed in the spacer plate 128 and encircles the exhaust passage 127 for assisting in cooling and silencing.

Continuing to describe the exhaust system now by added reference to FIG. 4, it will be seen that an inner shell 131 is contained within the upper portion oft he drive shaft housing outer casing 56. This inner shell 131 forms an expansion chamber 132. An exhaust pipe 133 is connected to the underside of the spacer plate 128 by fasteners 134, and communicates at its upper end with the spacer plate exhaust passage 127 and at its lower end with the expansion chamber 132. Therefore, exhaust gases flow through this system into the expansion chamber 132 to provide silencing and cooling.

The spacer plate 128 is provided with one or more water drains 135 that communicate the cooling jacket 129 of the spacer plate 128 with a further cooling jacket 136 formed in the area between the inner shell 131 and the drive shaft housing 56. Water fills this chamber and cools the exhaust gases and precludes the transmission of heat to the drive shaft housing 55.

A wall member 137 extends across the lower part of the shell 131 and has an exhaust passage 138 from which exhaust gases may exit the expansion chamber 132 into a high-speed exhaust gas discharge chamber 139 formed in the lower unit 57. This chamber 138 communicates with a through-the-hub exhaust discharge passage 141 so as to discharge the exhaust gases from the engine through a through-the-hub exhaust gas discharge 142 formed in the hub of the propeller 58. Thus, the exhaust gases from the engine will be silenced by this underwater discharge.

The cooling jacket 136 formed around the expansion chamber 132 is formed with one or more drain passages 143 (FIG. 4) that permits engine coolant to mix with the exhaust gases in the chamber 139 and flow out with the exhaust gases back to the body of water in which the watercraft is operating.

In addition to the exhaust gas discharge already described, which may be considered to be a high-speed exhaust gas discharge, the outboard motor 51 may be provided with an above-the-water low-speed exhaust gas discharge. Such discharges are well known in this art and, for that reason, further description of them are not believed to be necessary to permit those skilled in the art to practice the invention.

It will be seen that the exhaust ports 122 are disposed so that their upper opening edge is disposed at a distance ES below the upper cylinder block surface 66 and the upper end of the cylinder bore 64. Also, it will be noted that the exhaust ports. 122 open before the scavenge ports 97 open.

Referring now to FIG. 5, certain additional auxiliary components for the engine 53 are illustrated and will be described. As has been noted, the engine is provided with a flywheel magneto assembly 101. This assembly also includes a starter gear that is engaged by an electrically operated starter 144 for electric starting of the engine. The engine 53 may also be provided with a lubricating system of any know type, and this may include a lubricant reservoir 145 mounted in proximity to the air inlet device 83.

Also, the throttle linkage, including the throttle link 89, may be connected to a pulser coil of an ignition system, indicated by the reference numeral 146, so as to provide spark advance, as is well known in this art.

The, construction of the engine and outboard motor as thus far described may be considered to be conventional, except for the fuel injector 104 and its mounting and geometric relation to the pistons 72. This construction will now be described by particular reference to FIGS. 3 and 6–14.

Figure 3:
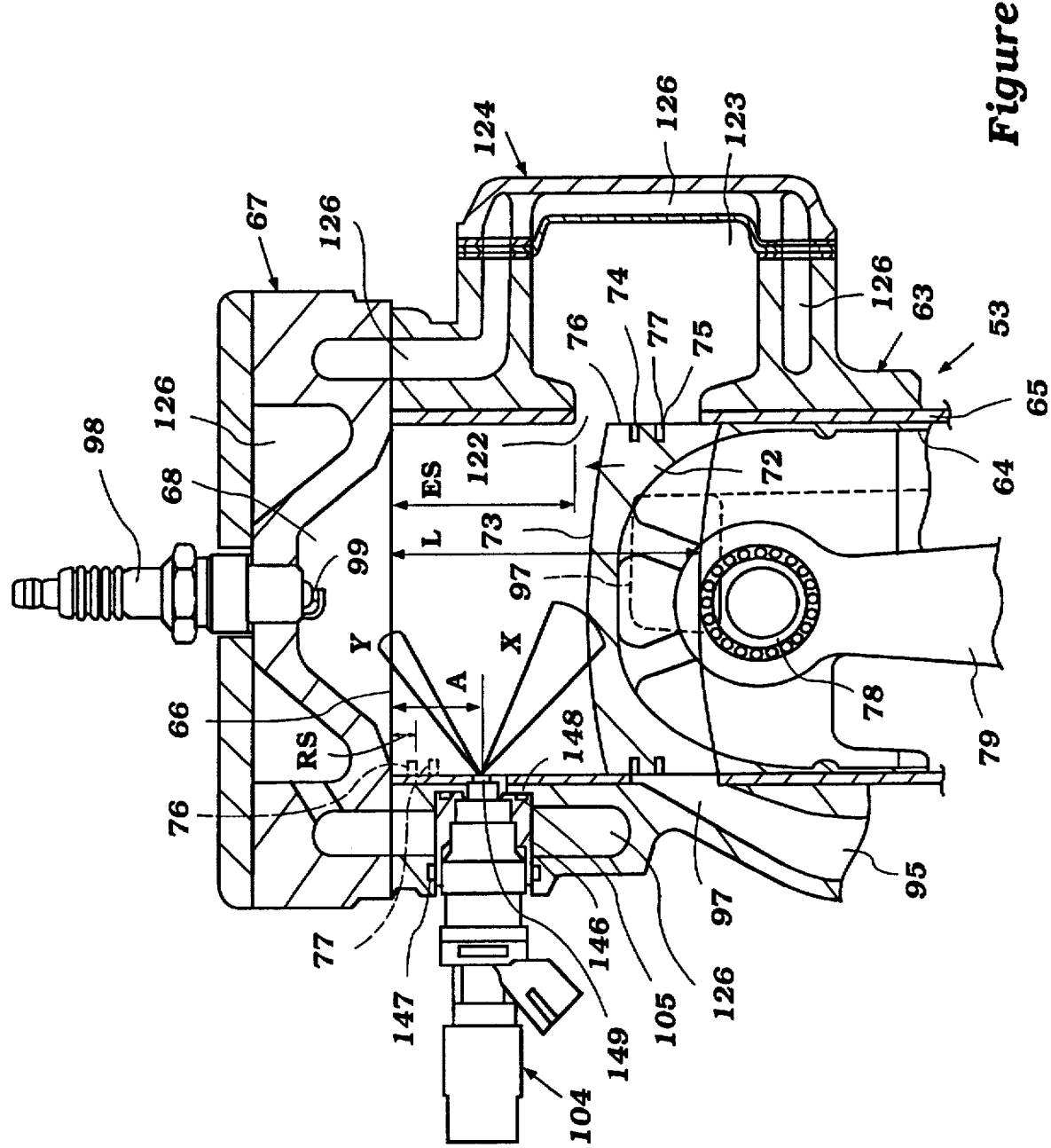
FIG. 3 is a partial cross-sectional view, generally similar to the cross-sectional view of FIG. 1 but showing the components in non-schematic fashion.

Referring first to FIG. 3, this shows the manner in which the injector 104 is actually mounted in the cylinder block 63. The cylinder block 63 is provided with a counter-bored portion adjacent each of its injector clearance holes 105. An injector mounting insert piece 146 is received in this recess and is sealed thereto by a circumferential O-ring 147 and an end O-ring 148. The injector 104 is mounted so that its discharge nozzle portion 149 registers with the cylinder bore opening 105 so that fuel will be sprayed therefrom in a pattern which will be described later in more detail.

Figure 6:
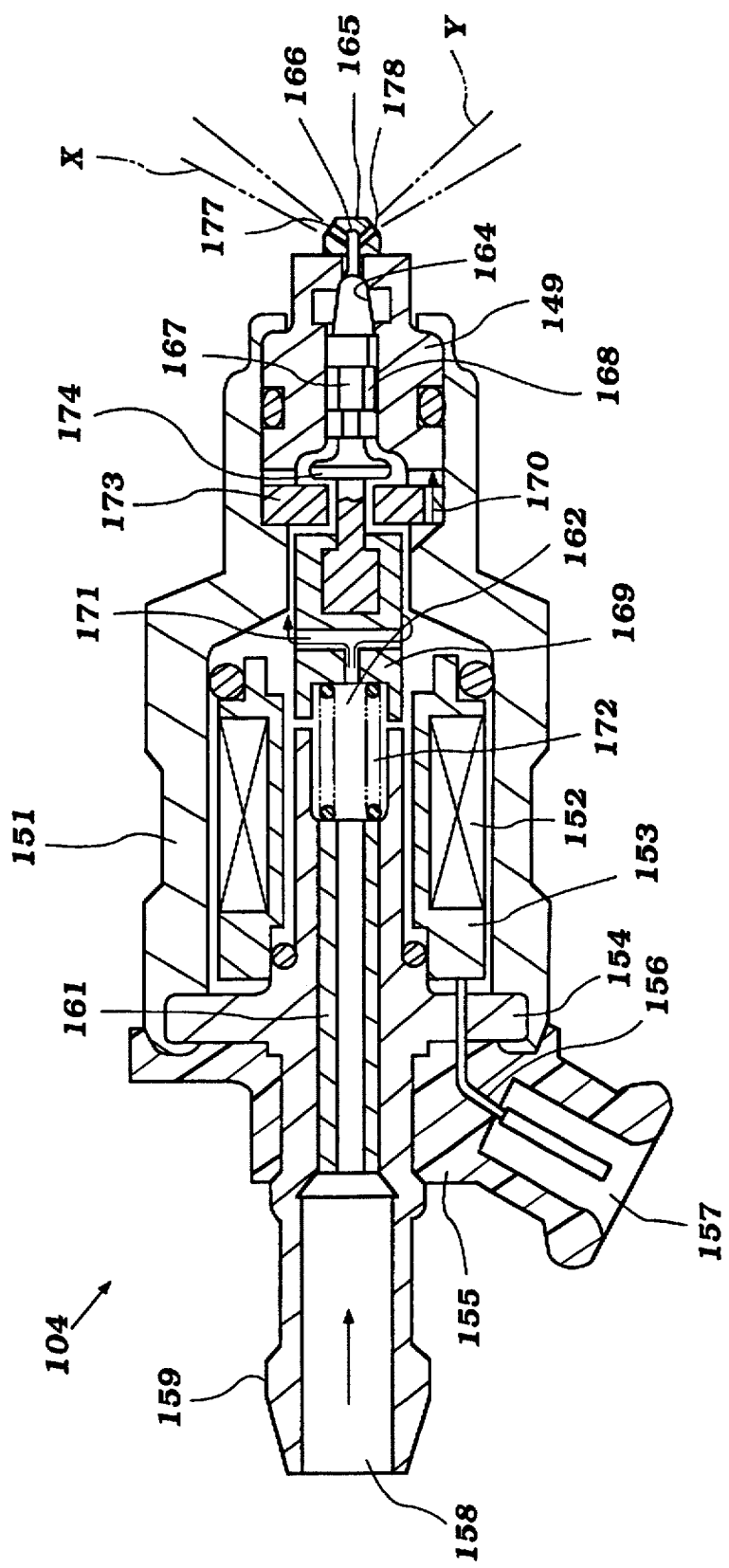
FIG. 6 is an enlarged cross-sectional view showing the fuel injector.
Figure 7:
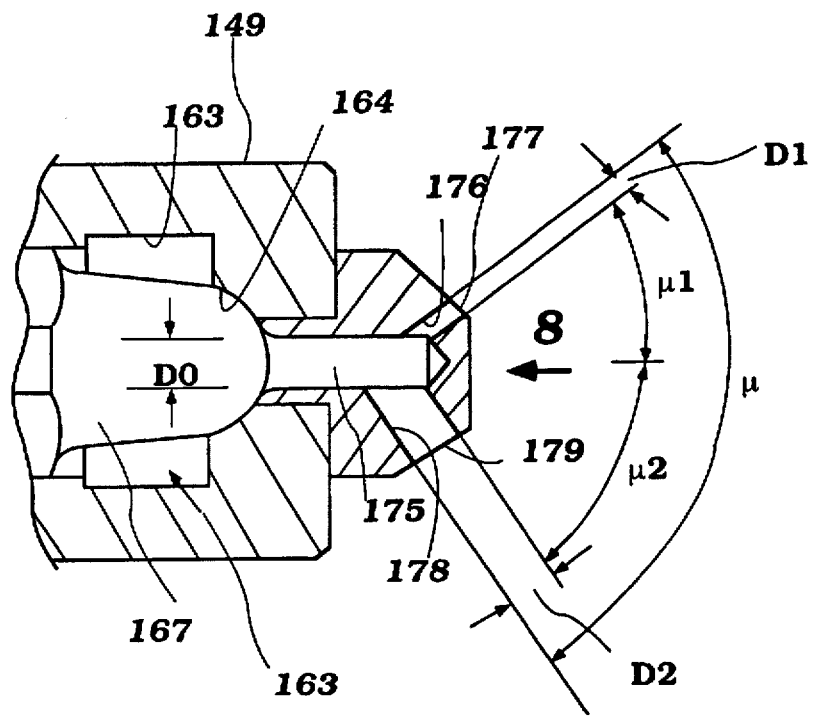
FIG. 7 is a still further enlarged cross-sectional view of the tip of the fuel injector nozzle portion so as to illustrate the spray nozzle openings therein.
Figure 8:
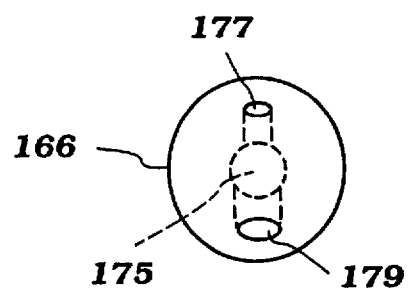
FIG. 8 is a view of the fuel injector nozzle portion on a smaller scale and looking in the direction of the arrow 8 in FIG. 7.

Referring now primarily to FIGS. 6–8, each injector 104 is comprised of a main body portion 151 that defines an internal cavity in which a solenoid winding 152 is supported on a core 153. The core 153 is itself supported on an end closure 154 which is, in turn, sealed by a plastic cap 155. Conductors 156 extend from the winding 152 to a terminal portion 157 formed in the cap 155 for attachment to a controlled electrical source of power. This electrical source of power is controlled in a manner and in accordance with a strategy which will be described.

The end closure 154 is formed with an integral fuel delivery receiving portion 158 that is provided with a bayonetted end 159 so as to accommodate find provide a connection to the fuel rail 118 for supply of fuel to an internal passageway formed by a tubular member 161 that passes through the end closure 154 and which opens into a fuel receiving cavity 162 formed adjacent the nozzle end 149 of the injector. The nozzle portion 149 is formed with a fuel chamber 163 of annular configuration and which is centrally related to a valve seat 164.

The valve seat 164 communicates with a nozzle insert piece 165 that has a flow passage 166 extending therethrough, and which is valved by a pintle-type injector valve 167. The valve 167 is slidably supported by means of a polygonal-shaped portion 168 in a bore of the nozzle piece 149. As its rear end, an actuator element 169 is connected to the pintle valve 167, and it, in turn, has a flow passage 171 formed therein. Thus, fuel can flow from the passage formed by the tube 161 into a spring chamber 172, and then around the valve actuator 171 to the fuel chamber 163 for control by the pintle 164.

A stopper plate 173 having a flow opening 170 is contained at the base of the nozzle piece 149 and is engaged by a ribbed stop surface 174 of the pintle so as to limit the degree of opening of the pintle valve 167. The coil compression spring 172 normally urges the pintle valve 167 to its closed position. When the solenoid winding 153 is energized, the valve actuator 169, which acts as an armature, will be drawn inwardly to move the pintle valve 167 away from the valve seat 164 and permit flow from the discharge. This flow discharge will now be described by primary reference to FIGS. 3, 6–9 and 11–14.

It will be seen that the nozzle insert 166 is formed with a through opening 175 that has a diameter DO and which defines a general axis x which may be considered to be the central axis of the fuel injector nozzle portion 149, which is located, as previously noted, at a distance A (FIG. 3) from the cylinder bore end 66. This flow passage 145 is intersected by a first upwardly directed passage 176 that has an opening 177 in an outer face of the nozzle insert 166. The opening 177 has a diameter D1. The diameter D1 is smaller than the diameter DO. The lower edge of this opening 177 is disposed at an angle $\mu 2$ to the axis of the injector.

In addition, the nozzle insert 166 is formed with a second passage 178 which is generally downwardly directed and has an opening 179 in the lower face thereof. The opening 179 has a diameter D2 which is greater than the diameter D1, but also less than the diameter DO. The upper edge of this opening 179 is disposed at an angle $\mu 1$ from the injector axis. This angle $\mu 1$ is greater than the angle $\mu 2$, for a reason which will be described. The total angle of spray provided by the openings 177 and 178 is subtended by the arc $\mu$, which is preferably not less than 45°. In the specific embodiment, the angle $\mu$ is about 100°, while the angle $\mu 2$ is about 45°, while the angle $\mu 1$ is about 55°.

As has been mentioned, the fuel pressure supplied to the injectors 104 is regulated by the regulator 119. Preferably, the fuel supplied to the injector is adjusted to be in the range of 300–1000 kilopascal and more preferably 600–650 kp. When this is encountered, then the pressure in the recess 163 will also be at this same pressure when the pintle valve 167 is closed. However, if the injector is opened, the pressure will drop, and the pressure in the chamber 163 will then be about half of the former pressure. The pressure losses are such so that the flow of fuel through the injector openings 177 and 178 is at a velocity of in the range of 10–30 meters per second, and preferably about 20 meters per second. This will control the maximum penetration of the fuel into the cylinder, and will be as described shortly.

Figure 9:
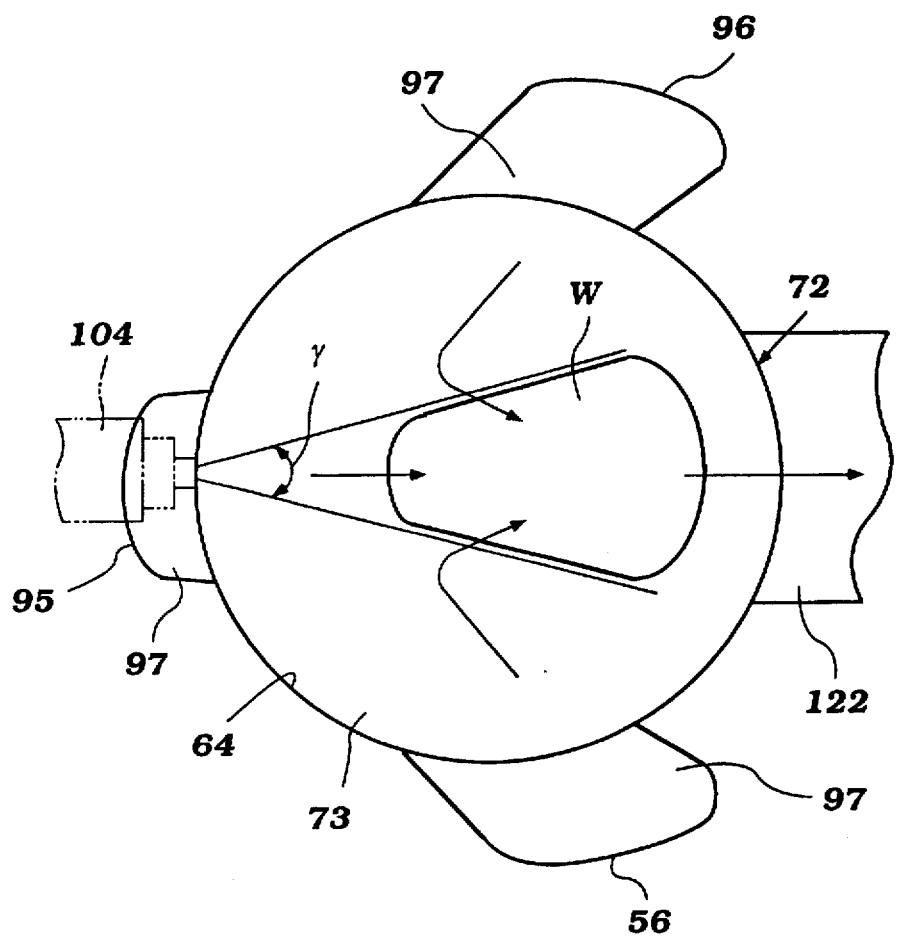
FIG. 9 is a top plan view showing how the spray pattern causes the fuel to impinge upon the head of the piston.

As may be seen in FIGS. 3 and 9, the spray relationship is such that a portion of the fuel, that is, specifically that flowing from the nozzle opening 178, will be directed toward and impinge upon the piston head 73. The remaining fuel spray, which is preferably smaller in volume, will be directed toward the cylinder head recess 68, and specifically, the spark plug gap 99. As a result of this spray pattern, there will be ensured the presence of the stoichiometric mixture at the vicinity of the spark gap 99 when the spark plug 98 is fired. In addition, a homogeneous mixture will fill the remainder of the combustion chamber, which may or may not be stoichiometric, depending upon the engine running condition.

As may be seen in FIG. 9, the spray pattern is such that the wetted area of the piston head 73 will be as indicated at W in this figure. The spray angle in this plane is indicated as $\lambda$.

The importance in the relationship of the angles of injection from the injector nozzles 177 and 179 will now be described by particular reference to FIGS. 11–14, which show the condition during various portions of the piston stroke. As has been previously noted, the injector axis, indicated at x in these figures, is such so that the angle $\mu 2$ between this axis x and the upper end Y of the spray pattern from the upper directed nozzle opening 177 will be directed toward the gap of the spark plug 98.

The actual spray axis from the opening 177 is conical, and is indicated at Y1 in this group of figures. The lower edge of the spray pattern is at the angle $\beta 2$ from the axis x. As has been previously noted, the amount of fuel in the spray pattern Y is less than that from the spray pattern X associated with the nozzle port 179.

Referring to that particular nozzle pattern, it has been previously noted that the upper edge of this spray pattern is at the angle $\mu 1$ below the spray axis x. It should be noted that this angle is such that it is less than the angle between the spray axis x and the upper edge, of the exhaust port 122, which angle is indicated at EX1. Hence, the spray pattern X is such from the nozzle port 179, which spray pattern is also conical and indicated at X1, so that it will be directed below the upper edge of the exhaust port under all conditions. The lower peripheral extent of this spray pattern from the lower nozzle port 179 is at a point $\beta 1$ so that the spray will contact the head of the piston during a substantial portion of the spraying interval.

Figure 11:
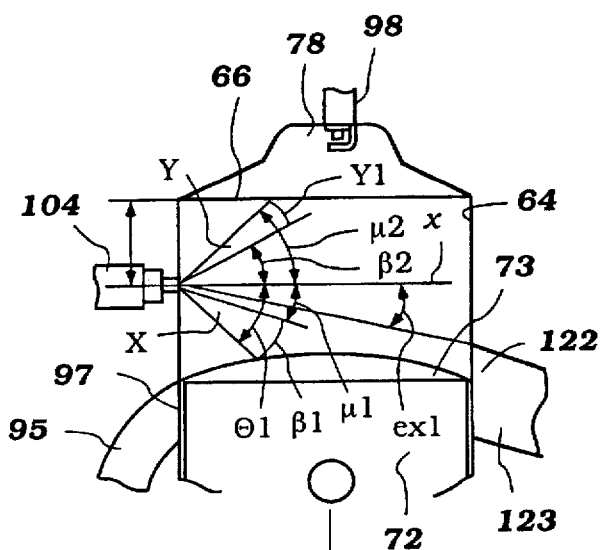
FIGS. 11, 12, 13 and 14 are cross-sectional views, in part similar to FIG. 3 and show the relationship of the spray pattern and fuel spray to the piston during the various portions of the stroke and may also be understood by reference to FIG. 10.

Thus, the spray interval is chosen so that the fuel from the nozzle 104 will be directed to the combustion chamber recess 78, and the area around the spark plug gap 99, and on the head 73 of the piston 72, but will be blocked from passing out of the exhaust port 122. Therefore, the timing of fuel injection is begun when the piston is on its downstroke, as shown in FIG. 11, but so that the penetration of the fuel spray will not reach the exhaust port opening 122. The condition shown in FIG. 11 is the condition at the start of injection when the engine is running at high-speed, high-load. This is the earliest time of injection and the most difficult condition.

Figure 12:
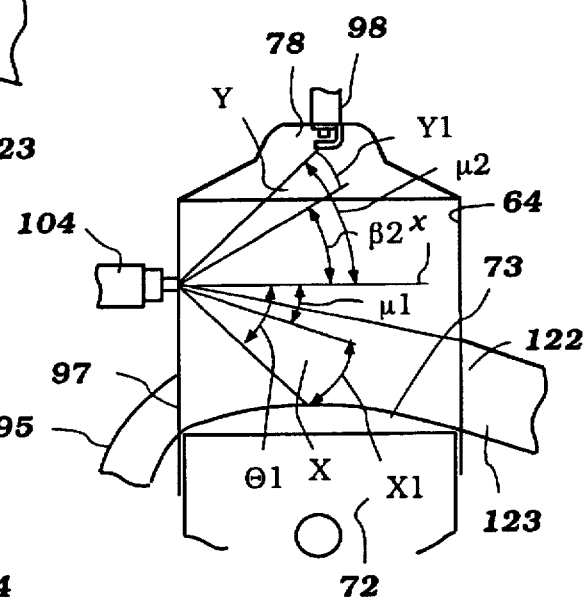
Figure 13:
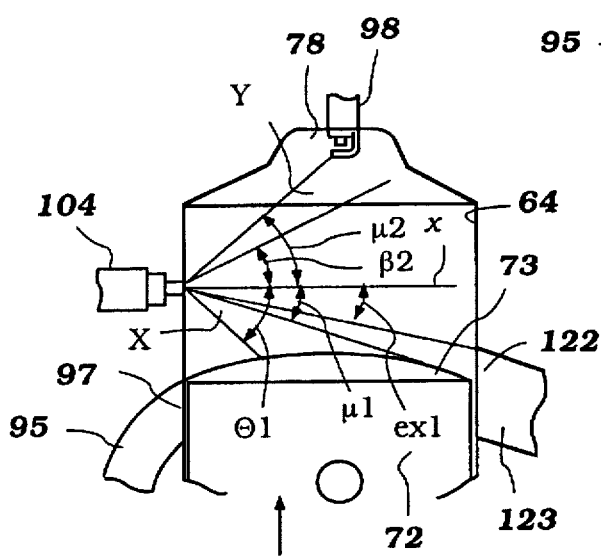
Figure 14:
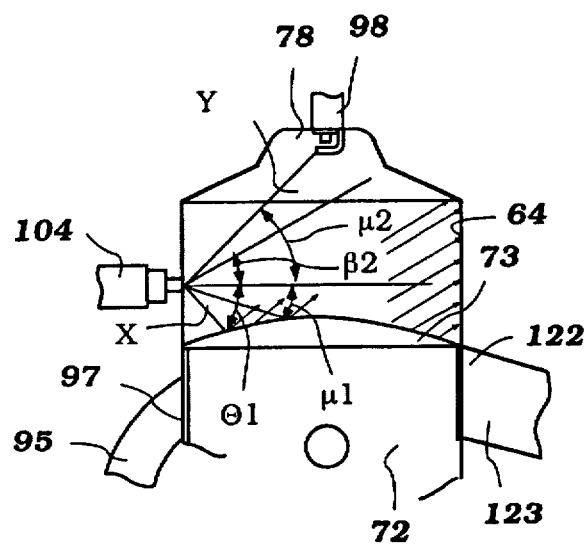
Figure 15:
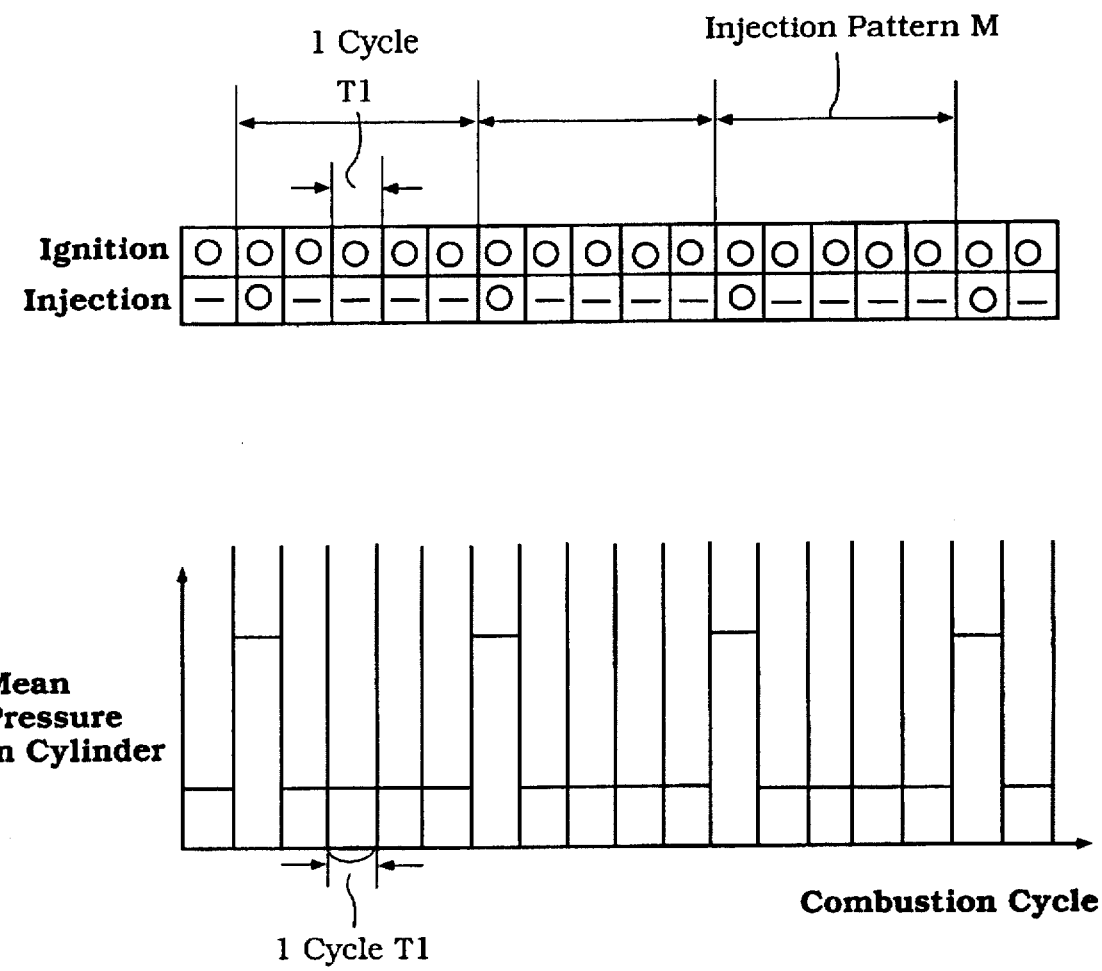
FIG. 15 is a timing diagram showing how the fuel injection may be skipped on alternate cycles and the mean pressure that exists in the combustion chamber during this skipping operation.

As the piston continues to move downwardly to the position shown in FIG. 12, and is, at this time, at its bottom dead center position, the fuel which impinges on the piston head 73, will be directed upwardly away from the exhaust port, as shown in the shaded lines in FIG. 14. Hence, the fuel impingement on the piston head 73 will occur first on the side well away from the exhaust port, and will only impinge upon the head of the piston at the side toward the exhaust port at the end of the stroke and after the piston has begun to move toward its top dead center position, as shown in FIG. 13.

The head 73 of the piston is highly heated, and the fuel spray impinging on it will have two important benefits. First, the fuel that evaporates and bounces off will be directed away from the exhaust port and toward the spark gap 99. In addition, the impingement of the fuel on the piston head 73 will also cause a cooling effect on the piston so as to reduce the likelihood of piston burning, even under high-load, high-speed conditions.

The timing of the fuel injection and the relationship of the piston to the location of the injector axis x is quite important in ensuring maximum performance of the engine and adequate fuel supply under all running conditions. The various running conditions will be described shortly by reference to FIG. 10, but before describing that figure, these critical relationships will be detailed.

The details are such that the location of the injector axis x at the distance A from the cylinder bore surface 66 relative to the stroke of the piston and the distance RS from the lowermost edge of the piston ring falls into the following relation relative to bottom dead center position L of the piston. This ratio should preferably be in the range so that RS<A<0.3L. This ratio has been found to provide adequate time for fuel injection under all conditions, and insurance against the fuel spraying out of the exhaust port 122.

To further ensure this, the distance between the upper peripheral edge of the exhaust port and the cylinder head cylinder block surface 66 (ES) should be such that: 0.35ES<A<0.65 ES. These relationships will ensure this result.

Although the specific control strategy by which the engine 53 is operated may be of any known type, the general components utilized in the engine management system will be described, referring back to FIG. 1. These components include a number of sensors of sensing both engine running conditions, as well as ambient conditions. Of course, it should be apparent to those skilled in the art, that the sensors which will be described are only typical of those types of sensors which can be utilized with the engine management system. Basically, the important feature of the invention is the timing strategy for fuel injection and the orientation and location of the fuel injector 104 and its spray paths X and Y.

Referring now specifically to FIG. 1, the system includes a main ECU 181 which controls through appropriate output signals the timing and duration of fuel injection from the fuel injector 104, which timing will be described later by reference to FIG. 10, the timing of firing of the spark plugs 98, and also the operation of the high-pressure fuel pump 116, so as to control its output.

The engine condition sensors include a throttle position sensor 182 that is associated with the throttle valve 87 and outputs a signal to the ECU 181 that indicates the operator demand, or alternatively, the load on the engine.

Positioned in the intake manifold 93 is an intake air temperature sensor 183 which also outputs its signal to the ECU 181.

As is well known in two-cycle engine practice, air flow to the engine may be accurately determined by measuring crankcase pressure at certain crank angles. Therefore, there is provided a crankcase pressure sensor 184 in the crankcase chamber 69, and which outputs a signal to the ECU 181 indicative of crankcase pressure.

The crank angles for setting Both timing of the various firing intervals of the spark plugs 98 and the injectors 104 and for indicating engine speed, is supplied by a crank angle sensor 185 which cooperates with a toothed gear on the crankshaft 81 so as to output appropriate signals indicative of crank angle to the ECU 181. By summing these crank angle pulses in a given time period, it is also possible to measure engine speed.

There is also provided an in-cylinder pressure sensor 186 that will output signals to the ECU 181 indicative of the actual pressure in the combustion chamber 68. This signal may be utilized for appropriate engine controls in accordance with any strategy known in the art.

There is further provided a knock detector 187, also mounted in the cylinder head 67, and which outputs its signal to the ECU 181. Appropriate knock control strategies may be employed for engine control.

The control system for the engine may also include a feedback control system that employs an oxygen sensor, indicated by the reference numeral 188. The oxygen sensor 188 is disposed in a chamber 189 that communicates with the cylinder bore 64 or combustion chamber recess 68, and which receives exhaust gases. These exhaust gases are then discharged into the exhaust manifold 123 through a check valved passageway 191. The output from the oxygen sensor 188 can be utilized to determine whether the air-fuel ratio is as desired, in a known manner.

Engine temperature is measured by a cylinder block engine temperature sensor 192 that is mounted in proximity to the cooling jackets afore referred to, and which will output a signal indicative of engine operating temperature for appropriate control.

It may also be desirable to measure the temperature of the cooling water which is delivered to the engine, and for this purpose, there can be provided a water inlet temperature sensor 193.

Under some conditions, it may also be desirable to be able to read the condition of the transmission which is in the lower unit 57 for driving the propeller 58, and a transmission condition sensor 194 is provided for this purpose.

In addition to those engine and engine-related sensors, there may also be provided an exhaust back pressure sensor 195. A trim angle sensor 196 senses the angle of trim of the outboard motor, and also outputs its signal to the ECU 181. Ambient conditions, such as atmospheric air pressure, may be sensed by a sensor 197, and also outputs its signal to the ECU 181. These various sensors and their signals can be utilized in accordance with any desired control strategy.

Even though the described construction is effective in ensuring that fuel will not pass out of the exhaust ports 122 during the running of the engine 51, there still remains the problem of residual exhaust gases due to the scavenging system common in two-cycle engines. Although these residual exhaust gases present no significant problem when running at mid or high range, they can be a significant problem when running at low speed and low loads. This is particularly true in outboard motors because of their long trolling conditions when they may run even below idle speed.

The presence of residual exhaust gases in the combustion chamber can dilute the new mixture, which is relatively lean, so that incomplete combustion or total lack of combustion may exist. Therefore, in accordance with an important feature if the invention, the system is operated under these extreme running conditions in such a way as to permit the residual charge to be clean from the cylinder before a next charge is injected. This is done as may be seen in the upper view of FIG. 15 by skipping injection timing during certain cycles.

In the specific illustration, injection timing occurs only one out of every five cycles. Of course, this number can be varied depending upon the actual running conditions. Also, the skipping of injection need not be done in all cylinders at the same time, but may be staggered so as to improve running performance. Hence, when no fuel is injection and as seen in the lower view of this figure, the mean pressure in the cylinder will be much lower and it is much easier for the engine to act as a pump and pump the residual exhaust gases out and replace it with a pure charge of fresh air. Thus, by skipping injection timing, it is possible to significantly improve engine running under low speeds and low loads.

In the illustrated embodiment, the ignition is shown as being repeated even though there is no injection. If desired, ignition can also be skipped during the time periods when fuel injection is not accomplished.

Figure 16:
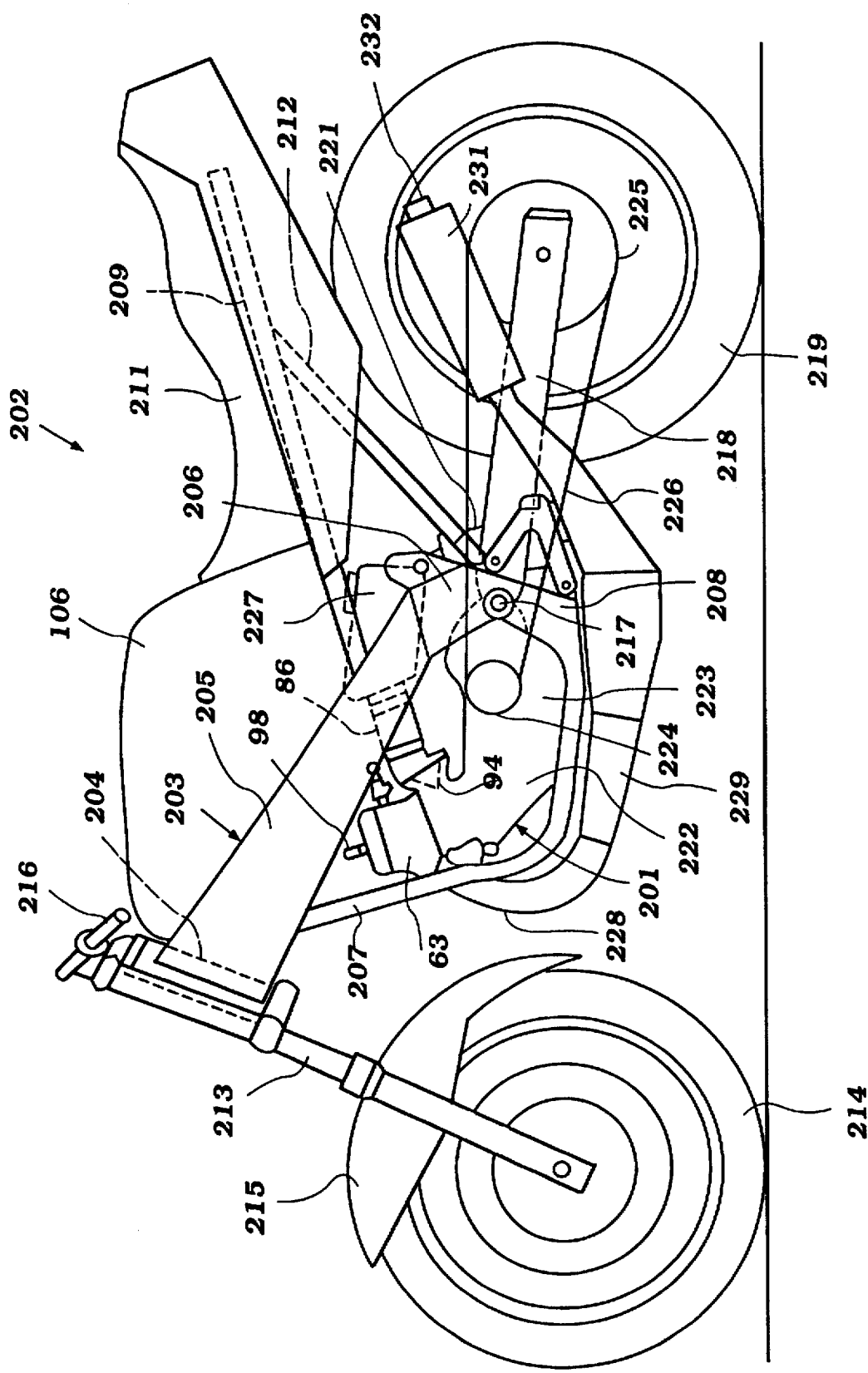
FIG. 16 is a side elevational view of a motorcycle showing another environment in which the invention may be utilized.
Figure 17:
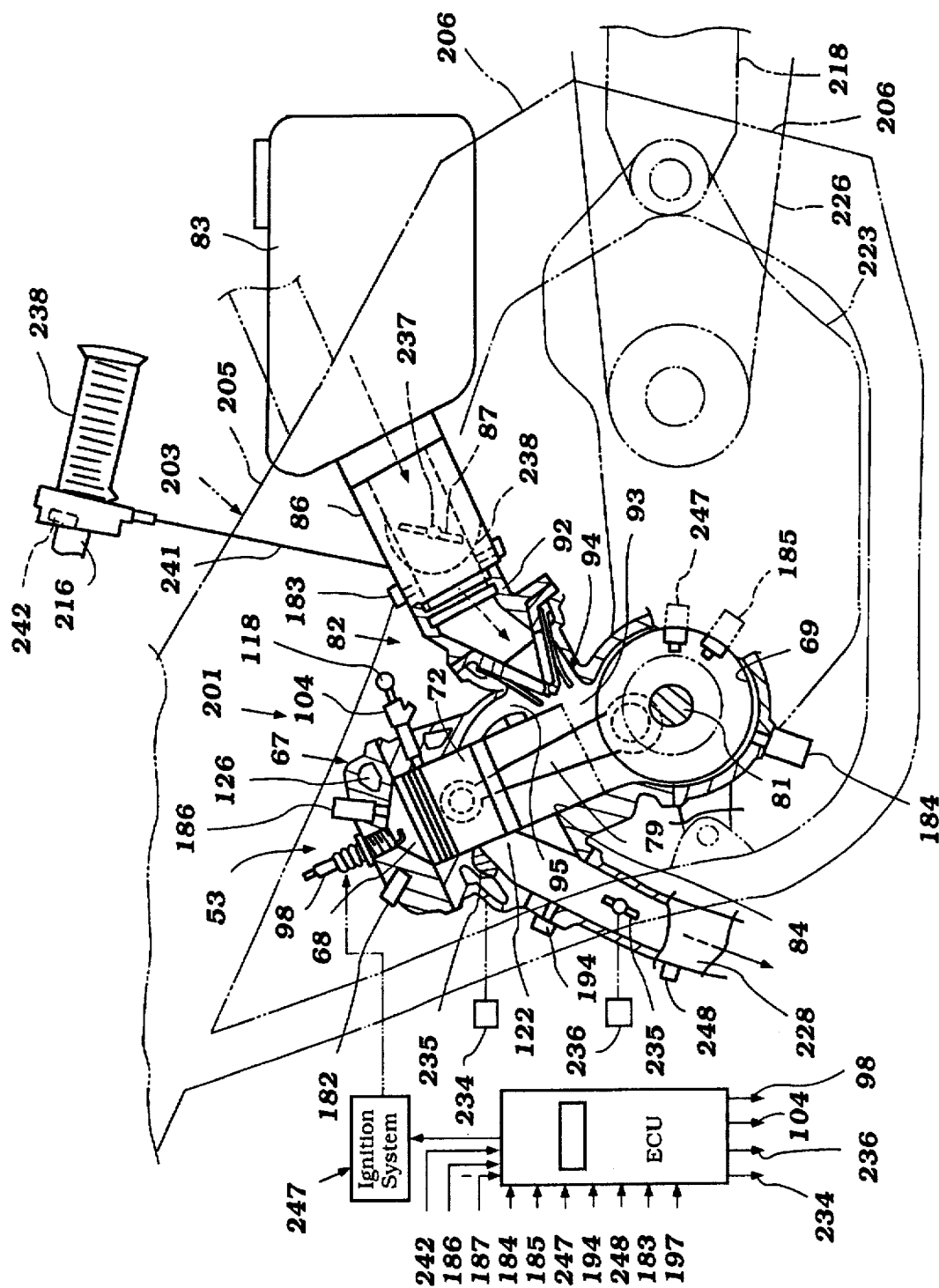
FIG. 17 is a view looking in the same direction as FIG. 16, but taken on a larger scale, showing the engine broken away and in part in section and also shows some of the association components schematically and others in phantom.
Figure 18:
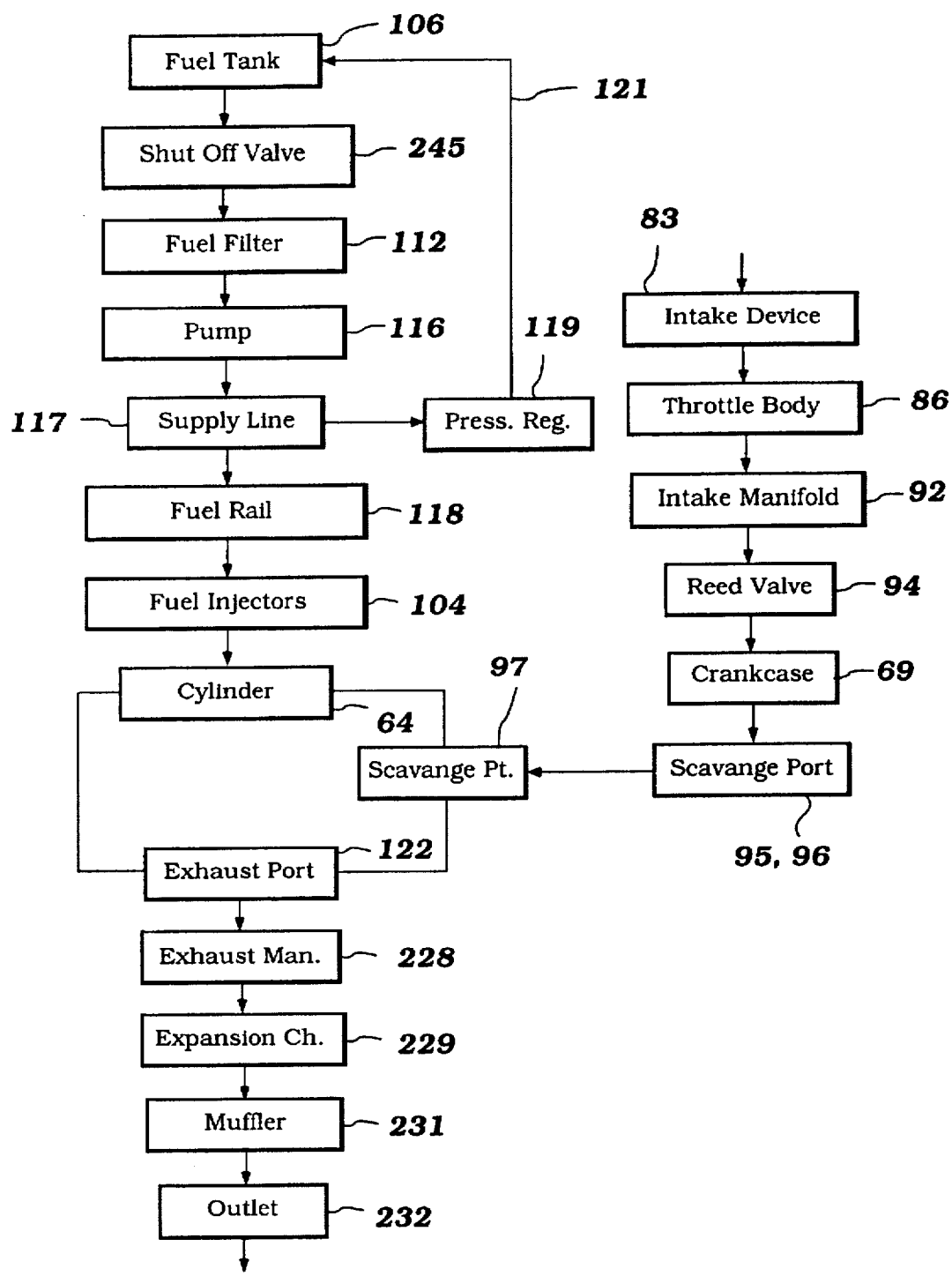
FIG. 18 is a schematic view showing the components of fuel injection and induction system of this embodiment.

Although the embodiment of the invention as thus far described has related to the application of the invention to an outboard motor, the invention is also susceptible of use, as has been mentioned, in a wide variety of other applications for internal combustion engines. FIGS. 16–18 show another embodiment of the invention wherein an engine constructed and operated in accordance with this embodiment is indicated by the reference numeral 201 and is utilized as the power plant for a motorcycle, indicated generally by the reference numeral 202. This is another potential application for the invention as is the application to various other types of vehicles including land vehicles.

In order to set the environment for the invention, the construction of the motorcycle 202 will be described primarily by the reference to FIG. 16 where it is shown in solid lines. The motorcycle 202 is comprised of a built-up frame assembly, indicated generally by the reference numeral 203, and which includes a head pipe 204. Extending rearwardly and downwardly from the head pipe 204 are a pair of main frame members 205 which terminate at a rear bracket 206 to which they are rigidly connected, as by welding.

A pair of downtubes 207 extend downwardly from the forward portion of the main tubes 205 to which they are fixed as be welding. These downtubes 207 extend downwardly and then rearwardly and also connected to a lower portion 208 of the bracket 206 as by welding.

The frame further includes a seat rail 209 that extends rearwardly from the main frame members 205 and which carries a seat 211. The seat 211 is further supported by rear seat stays 212 that extend upwardly and rearwardly from the bracket 206 for connection to the seat rail 509.

A fuel tank which is indicated by the reference numeral 106, that utilized to identify the fuel tank of the previously described embodiment, is disposed forwardly of the seat 211 and is supported by the main frame members 205 in any known manner.

A front fork 213 is dirigibly supported by the head tube 204 and journals a wheel 214 at its lower end. A front fender 215 may also be carried by the front fork 213. The front fork 213 and front wheel 214 are steered by a handle bar assembly 216 disposed forwardly of the seat 211 and the fuel tank 106.

The bracket assembly 206 provides a pivotal support 217 for a trailing arm assembly 218. A rear wheel 219 is rotatably journaled at the rear end of the trailing arm 218. The rear suspension including the trailing arm 218 is controlled by a linkage and shock absorber assembly which is does not appear in significant detail, but which is indicated by the reference numeral 221.

In accordance with conventional motorcycle practice, the engine 201 is provided with a crankcase transmission assembly 222 that includes a transmission case portion 223. This transmission case portion 223 contains, as is typical with motorcycle practice, a change speed transmission that drives an output sprocket 224 at selected speed ratios. The sprocket 224, in turn, drives a sprocket 225 that is fixed for rotation with the rear wheel 219 through a chain 226.

Before turning further to the internal details of the engine 201, its induction and exhaust system will be described in detail. The induction system is basically the same as the induction system employed in conjunction with the outboard motor 51 of the embodiment of FIGS. 1–15. However, rather than using only an air inlet device that employs a silencer, the engine 201 is provided with an atmospheric air inlet device 227 which is disposed to the rear of the engine 201 and beneath the fuel tank 106. This device 227 includes, in addition to a silencing arrangement, a filter for removing foreign particles from the air. Beyond this, the air inlet device 227 supplies the inducted air to a throttle body 86 and intake manifold 92 that serves intake ports 93 in which reed-type check valves 94 are provided.

As may be seen in FIG. 17, the internal components of the engine are as previously described and where that is the case, they have been identified by the same reference numerals as utilized in conjunction with the description of the engine 201. Additional components, to be described later, are also employed and these will also be described later by reference to FIG. 17.

The exhaust system for the engine 201 is also different from that utilized with an outboard motor, the embodiments previously described. The exhaust system is basically conventional and therefore will be described only generally. It includes an exhaust manifold 228 which collects the exhaust-gases from the cylinder block exhaust ports 122, but which formed externally of the cylinder block 63 unlike the outboard motor application. The exhaust gases are delivered from the exhaust manifold 228 to an expansion chamber device 529 and which may include a catalytic convertor including a three-way catalyst. The exhaust gases are then transferred to a muffler 231 which has a tailpipe 232 of relatively short length for discharge of the exhaust gases to the atmosphere.

From the foregoing description is should be readily apparent that the earlier description of the application for the engine is of a type that may be well known in the art. For the same reasons as previously described, therefore, further details of the construction of the motorcycle and engine 201, except in so far as they relate to the construction and operation of the invention, will be left to those skilled in the art who should have no difficulty in practicing the invention from this description.

Referring now in detail to FIG. 17, the internal components of the engine. 201 will be described, but only in so far as they differ from those of the previously described embodiments. Basically although the layout may be different, the components are the same and where that is the case they have been identified by the same reference numerals and will not be described again.

In conjunction with this application, however, each of the exhaust ports 122 is provided with an exhaust control valve.. indicated generally by the reference numeral 233 which is disposed in conjunction with the exhaust ports 122 and is configured and operated by a servo-motor 234 in such a way as to change the effective compression ratio of the engine 201. This is done by changing the exhaust port opening and closing timing in a manner as is well known in this art. This feature may be utilized in conjunction with the fuel injection strategy since because the exhaust port timing is changed, the injection timing can be changed to take advantage of the changed exhaust port timing.

Figure 10:
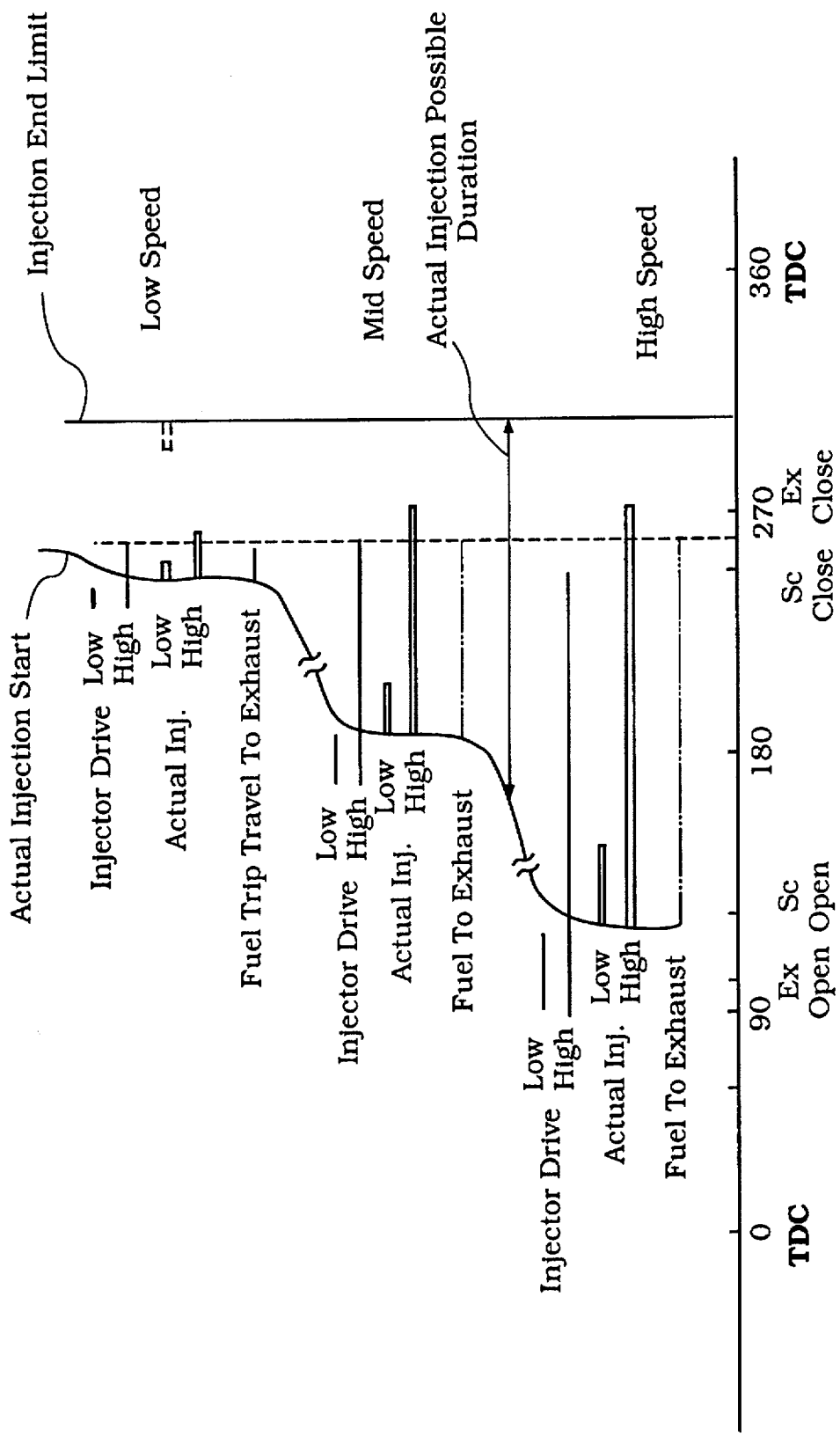
FIG. 10 is a timing diagram showing the events and sequence of operation in accordance with this embodiment of the invention.

As has been described in conjunction to reference to FIG. 10, the injection end limit is set primarily by the point at which the fuel injector 104 is masked by the movement of the pistons 72. However, the timing of closing of the exhaust port is also significant in controlling the timing of fuel injection. Therefore, if the timing of closing of the exhaust port is advanced, the timing of the end of fuel injection can also be advanced.

In addition to the exhaust timing control valve 233, there may be provided in the exhaust manifold 228 or in some other component of the exhaust discharge system, an exhaust control valve 235. The exhaust control valve 235 is opened and closed so as to control pressure pulses feedback to the engine through the exhaust system. Again, this type of device is known in the art. The exhaust control valve 235 is controlled by a servo-motor 236 in conjunction with any desired strategy.

The drawings also show the manner in which the throttle valves 87 are controlled in more detail than the previously embodiment. Like the previous embodiment, the throttle valves 87 are fixed to a throttle valve shaft, indicated by the reference numeral 237, which is journaled in the throttle body 86 in a known manner. However, a twist grip throttle control 238 is mounted on one of the handlebars 216 and is connected to a pulley 239 affixed to one end of the throttle valve shaft 237 by means of a wire actuator 241.

Rather than employing a throttle position sensor such as the sensor 182 in the previous embodiment, a throttle actuator sensor 242 may be employed in this embodiment to supply a control signal to the ECU, which is indicated in this embodiment by the reference numeral 243. A different reference numeral is utilized for the designation of the ECU in this embodiment merely because it controls additional functions such as the operation of the exhaust control servo-motor 234, the exhaust control valve servo-motor 236, as well as the firing of the spark plugs 98 by an ignition system shown schematically in this figure and indicated by the reference numeral 243.

As may be seen in FIGS. 16 and 18, the fuel supply system for supplying fuel to the fuel injectors 104 differs in two regards from the outboard motor system. In this embodiment, there is no vapor separator. However, there is a main fuel shut-off valve, indicated by the reference numeral 246, which is interposed between the fuel tank 106 and a fuel filter 112. From the fuel filter, fuel is supplied to the high pressure pump 116 and then through the supply conduit 117 to the fuel rail 118. In this environment, the fuel rail runs transversely along the upper side of the engine between the cylinder block 63 and the engine induction system.

The ECU 243 has a CPU 244 that receives the various input signals as with the previously described embodiment plus some additional input signals, as will now be described. These input signals are then utilized to control the engine and specifically the ignition system 244 and the other components already described.

In this embodiment, there are certain additional sensors and these include an actual crankshaft speed sensor 247 which is provided in addition to the crank angle sensor 185. There is also provided in the exhaust manifold 238, an exhaust temperature sensor 248. This temperature sensor is utilized in combination with the exhaust control valve 235 so as to tune the exhaust to optimum performance. In all other regards, the construction and operation of this embodiment is the same as that described and for this reason, further description of this embodiment is not believed to be necessary to permit those skilled in the art to practice the invention. The engine control also uses the cylinder injection skipping to improve scavenging and running at low speed and loads, as described with the previous embodiment.

Thus, from the foregoing description, it should be readily apparent that the described embodiments of the invention are very effective in providing in-cylinder fuel injection with a low cost relatively low pressure fuel injector. In addition, the position of the injector to be protected by the piston does not interfere with its ability to spray adequate fuel for all running conditions. The spray pattern is also such that a stratified charge may be formed in the combustion chamber and full combustion of fuel will result under all running conditions. Low speed and load operation is improved by injection skipping to improve scavenging. Of course, the foregoing description is that of preferred embodiments of the invention and various changes and modifications may be made without departing from the spirit and scope of the invention, as defined by the appended claims.

What is claimed is:

1. A direct cylinder injected, two cycle, internal combustion engine comprised of a cylinder block having a cylinder bore extending from an upper peripheral edge closed by a cylinder head, a piston reciprocating in said cylinder bore between a bottom dead center (BDC) position and a top dead center (TDC) position and forming with said cylinder bore and cylinder head a variable volume combustion chamber, scavenge and exhaust ports opening through said cylinder bore for admitting a fresh charge and exhausting a burnt charge, respectively from said chamber, a fuel injector supported within said cylinder block and having a nozzle having a spray axis extending transversely into said cylinder bore and disposed diametrically opposite said exhaust port, said spray axis intersecting said cylinder bore at the point where it discharges such that said spray axis is covered by said piston during at least a portion of its stroke, a spark plug for firing a charge in said chamber control means for controlling the spray from said fuel injector from reaching said exhaust port before said exhaust port is closed under substantially all running conditions, and means for precluding said fuel injector from injecting fuel into said chamber during at least one cycle in response to certain running conditions.

2. A direct cylinder injected internal combustion engine as set forth in claim 1 wherein the injection of fuel is precluded for several cycles in response to the certain running conditions.

3. A direct cylinder injected internal combustion engine as set forth in claim 1 wherein the certain running conditions are low load conditions.

4. A direct cylinder injected internal combustion engine as set forth in claim 3 wherein the injection of fuel is precluded for several cycles in response to the certain running conditions.

5. A direct cylinder injected internal combustion engine as set forth in claim 1, wherein the control means advances the initiation of the spray of fuel from the fuel injector in response to increasing engine speeds and engine loads.

6. A direct cylinder injected internal combustion engine as set forth in claim 5, wherein the control means discontinues the timing of the termination of fuel injection under substantially all conditions before the exhaust port is closed.

7. A direct cylinder, two cycle, internal combustion engine comprised of a cylinder block having a cylinder bore extending from an upper peripheral edge closed by a cylinder head, a piston reciprocating in said cylinder bore between a bottom dead center (BDC) position and a top dead center (TDC) position and forming with said cylinder bore and cylinder head a variable volume combustion chamber, scavenge and exhaust ports opening through said cylinder bore for admitting a fresh charge and exhausting a burnt charge, respectively from said chamber, a fuel injector supported within said cylinder block and having a nozzle having a spray axis extending transversely into said cylinder bore, said spray axis intersecting said cylinder bore at the point where it discharges such that said spray axis is covered by said piston during at least a portion of its stroke, a spark plug for firing a charge in said chamber, said piston having a piston head facing said cylinder head and at least an upper ring groove extending circumferentially therearound and receiving a piston ring, the distance between said piston at said BDC position and the upper peripheral edge of said cylinder bore being expressed as the dimension L, the distance between the lower end of said ring groove and said upper peripheral edge of said cylinder head when said piston is at said TDC position being expressed by the dimension RS, said spray axis laying at a distance A from said cylinder bore upper peripheral edge and such that said spray axis is covered by said piston dating at least a portion of its stroke, and the following relationship is true:

$$RS<A<0.3L.$$

8. A direct cylinder injected internal combustion engine as set forth in claim 7 wherein the upper peripheral edge of the exhaust port is spaced a distance ES from the upper peripheral edge of the cylinder bore and wherein the following relationship exists:

$$0.35ES<A<0.065ES.$$

9. A direct cylinder injected internal combustion engine as set forth in claim 8 wherein the fuel injector is disposed between the upper peripheral edge of the scavenge port and the upper peripheral edge of the cylinder bore.

10. A direct cylinder injected internal combustion engine as set forth in claim 9 wherein the injection of fuel is precluded for at least one cycle in response to certain running conditions.

11. A direct cylinder injected internal combustion engine as set forth in claim 10 wherein the certain running conditions are low load conditions.

12. A direct cylinder injected internal combustion engine as set forth in claim 11 wherein the injection of fuel is precluded for several cycles in response to the certain running conditions.

13. A method of operating a direct cylinder injected, two cycle, internal combustion engine comprised of a cylinder block having a cylinder bore extending from an upper peripheral edge closed by a cylinder head, a piston reciprocating in said cylinder bore between a bottom dead center (BDC) position and a top dead center (TDC) position and forming with said cylinder bore and cylinder head a variable volume combustion chamber, scavenge and exhaust ports opening through said cylinder bore for admitting a fresh charge and exhausting a burnt charge, respectively from said chamber, a fuel injector supported within said cylinder block disposed diametrically opposite said exhaust port and having a nozzle having a spray axis extending transversely into said cylinder bore, said spray axis intersecting said cylinder bore at the point where it discharges such that said spray axis is covered by said piston during at least a portion of its stroke, and a spark plug for firing a charge in said chamber, said method comprising the steps of sensing engine running conditions, controlling the spray from said fuel injector from reaching said exhaust port before said exhaust port is closed under substantially all running conditions and precluding said fuel injector from injecting fuel into said chamber during at least one cycle in response to certain running conditions.

14. A method of operating a direct cylinder injected internal combustion engine as set forth in claim 13 wherein the injection of fuel is precluded for several cycles in response to the certain running conditions.

15. A method of operating a direct cylinder injected internal combustion engine as set forth in claim 13 wherein the certain running conditions are low load conditions.

16. A method of operating a direct cylinder injected internal combustion engine as set forth in claim 15 wherein the injection of fuel is precluded for several cycles in response to the certain running conditions.

17. A method of operating a direct cylinder injected, two cycle, internal combustion engine comprised of a cylinder block having a cylinder bore extending from an upper peripheral edge closed by a cylinder head, a piston reciprocating in said cylinder bore between a bottom dead center (BDC) position and a top dead center (TDC) position and forming with said cylinder bore and cylinder head a variable volume combustion chamber, scavenge and exhaust ports opening through said cylinder bore for admitting a fresh charge and exhausting a burnt charge, respectively from said chamber, a fuel injector supported within said cylinder block and having a nozzle having a spray axis extending transversely into said cylinder bore, said spray axis intersecting said cylinder bore at the point where it discharges such that said spray axis is covered by said piston during at least a portion of its stroke, and a spark plug for firing a charge in said chamber, the piston has a piston head facing the cylinder head and at least an upper ring groove extending circumferentially therearound and receiving a piston ring, the distance between said piston at said BDC position and the upper peripheral edge of said cylinder bore being expressed as the dimension L, the distance between the lower end of said ring groove and said upper peripheral edge of said cylinder head when said piston is at said TDC position being expressed by the dimension RS, said spray axis laying at a distance A from said cylinder bore upper peripheral edge and such that said spray axis is covered by said piston during at least a portion of its stroke, and the following relationship is true:

$$RS<A<0.3L.$$

said method comprising the steps of sensing engine running conditions and precluding said fuel injector from injecting fuel into said chamber during at least one cycle in response to certain running conditions.

18. A method of operating a direct cylinder injected internal combustion engine as set forth in claim 17 wherein the upper peripheral edge of the exhaust port is spaced a distance ES from the upper peripheral edge of the cylinder bore and wherein the following relationship exists:

$$0.35ES<A<0.065ES.$$

19. A method of operating a direct cylinder injected internal combustion engine as set forth in claim 18 wherein the fuel injector is disposed between the upper peripheral edge of the scavenge port and the upper peripheral edge of the cylinder bore.

20. A method of operating a direct cylinder injected internal combustion engine as set forth in claim 19 wherein the injection of fuel is precluded for several cycles in response to the certain running conditions.

21. A method of operating a direct cylinder injected internal combustion engine as set forth in claim 19 wherein the certain running conditions are low load conditions.

22. A method of operating a direct cylinder injected internal combustion engine as set forth in claim 21 wherein the injection of fuel is precluded for several cycles in response to the certain running conditions.

* * * * *

UNITED STATES PATENT AND TRADEMARK OFFICE
CERTIFICATE OF CORRECTION

PATENT NO. : 5,713,325
DATED : February 3, 1998
INVENTOR(S) : Yoshida et al.

It is certified that error appears in the above-identified patent and that said Letters Patent is hereby corrected as shown below:

Column 17, claim 7,
Line 18, please delete "piston dating" and replace with -- piston during --

Signed and Sealed this

Nineteenth Day of March, 2002

Attest:

JAMES E. ROGAN
*Director of the United States Patent and Trademark Office*

*Attesting Officer*